(12) United States Patent
Conti et al.

(10) Patent No.: US 8,316,298 B2
(45) Date of Patent: Nov. 20, 2012

(54) METHOD AND APPARATUS FOR PROVIDING ENTERTAINMENT THROUGH AN INTERACTIVE DEVICE

(76) Inventors: Aaron Conti, Hoffman Estates, IL (US); Donald Conti, Palatine, IL (US)

( * ) Notice: Subject to any disclaimer, the term of this patent is extended or adjusted under 35 U.S.C. 154(b) by 2292 days.

(21) Appl. No.: 10/174,258

(22) Filed: Jun. 18, 2002

(65) Prior Publication Data

US 2004/0002774 A1    Jan. 1, 2004

(51) Int. Cl.
*G06F 17/00* (2006.01)
(52) U.S. Cl. ........ 715/701; 715/201; 715/202; 715/203; 715/204; 715/702; 345/419; 709/205
(58) Field of Classification Search ............... 715/500.1, 715/201–204, 701, 702; 345/419; 709/205; 706/16, 20
See application file for complete search history.

(56) References Cited

U.S. PATENT DOCUMENTS

| | | | |
|---|---|---|---|
| 4,245,430 A | 1/1981 | Hoyt | |
| 4,589,138 A | 5/1986 | Milner et al. | |
| 4,654,659 A | 3/1987 | Kubo | |
| 4,717,364 A | 1/1988 | Furukawa | |
| 4,904,988 A | 2/1990 | Nesbit et al. | |
| 5,291,607 A | 3/1994 | Ristic et al. | |
| 5,636,994 A | 6/1997 | Tong | |
| 5,646,593 A | 7/1997 | Hughes et al. | |
| 5,689,475 A | 11/1997 | Chaumet-Lagrange | |
| 5,692,225 A | 11/1997 | Bernardi et al. | |
| 5,712,619 A | 1/1998 | Simkin | |
| 5,733,131 A | 3/1998 | Park | |
| 5,777,578 A | 7/1998 | Chang et al. | |
| 5,852,401 A | 12/1998 | Kita | |
| 5,986,200 A | 11/1999 | Curtin | |
| D419,209 S | 1/2000 | Hampton et al. | |
| 6,016,322 A | 1/2000 | Goldman | |
| 6,022,273 A | 2/2000 | Gabai et al. | |
| D423,611 S | 4/2000 | Hampton et al. | |
| 6,064,854 A | 5/2000 | Peters et al. | |
| 6,088,017 A * | 7/2000 | Tremblay et al. | 345/156 |
| 6,215,498 B1 * | 4/2001 | Filo et al. | 345/419 |

(Continued)

OTHER PUBLICATIONS

Cheok et al., Touch-Space: Mixed Reality Game Space Based on Ubiquitous, Tangible, and Social Computing, ACM Personal and Ubiquitous Computing, vol. 6, Issue 5-6, Jan. 2002, pp. 430-442.*

(Continued)

*Primary Examiner* — Cesar Paula
*Assistant Examiner* — David Faber
(74) *Attorney, Agent, or Firm* — Vedder Price PC

(57) ABSTRACT

The present invention provides a method, device, and software program for providing entertainment by way of an interactive device. The device receives environmental data by way of at least one of a plurality of sensors, optionally stores that data in a datastore, determines the presence of an event by comparing that data to previously received and stored data, and performs a conspicuous act in response to the detection of an event. In addition to performing a conspicuous act, the device can send a transmission by way of a transmission device, thereby communicating with another device or a remote network. The device auto-initiates at least one conspicuous action and modifies behavior based on responses thereto. Because multiple inputs are received, the present invention can assign priorities to the inputs, executing resulting processes in their order of priority.

9 Claims, 4 Drawing Sheets

U.S. PATENT DOCUMENTS

| | | | | |
|---|---|---|---|---|
| 6,358,187 B1* | 3/2002 | Smith | | 482/4 |
| 6,373,389 B1* | 4/2002 | Przygoda et al. | | 340/572.4 |
| 6,424,333 B1* | 7/2002 | Tremblay et al. | | 345/156 |
| 6,714,213 B1* | 3/2004 | Lithicum et al. | | 715/701 |
| 6,761,637 B2* | 7/2004 | Weston et al. | | 463/42 |
| 6,964,022 B2* | 11/2005 | Snowdon et al. | | 715/759 |
| 2003/0004678 A1* | 1/2003 | Zhang et al. | | 702/152 |
| 2003/0088832 A1* | 5/2003 | Agostinelli et al. | | 715/526 |
| 2003/0190076 A1* | 10/2003 | DeLean | | 382/209 |

OTHER PUBLICATIONS

Ancient Art of War, online Wikipedia article (<http://en.wikipedia.org/wiki/The_Ancient_Art_of_War>), downloaded May 23, 2006, pp. 1-2.*

Microsoft® Computer Dictionary 119 (5th ed. 2002).*

* cited by examiner

METHOD AND APPARATUS FOR PROVIDING ENTERTAINMENT THROUGH AN INTERACTIVE DEVICE

BACKGROUND OF THE INVENTION

The present invention relates to the field of entertainment devices, and in particular environmental interactive entertainment devices that receive environmental data and respond accordingly. The present invention is useful primarily for providing entertainment in the context of the user's immediate environment and programmable preferences.

Entertainment devices have progressed significantly to include devices that can communicate with their environment by way of preprogrammed speech or other sounds, illuminating lights, or other such actions that can be readily sensed by a user. Such communications are based on simple input by the user, such as by pushing a button that will result in one of a small number of preprogrammed sentences being output by a speaker in the device. Moreover, personal management devices such as personal digital assistants (PDAs) can incorporate these features. However, both the forms of input and the reactions to those inputs are relatively simplistic. Prior art devices generate sounds, perform acts when buttons are actuated, recognize sounds or voices, use infrared transceivers to communicate with other devices, and use visual sensors to avoid knocking into objects. These devices fail to combine the capabilities of receiving input not only from the environment, but other devices or users, sensors and remote devices or networks, and reacting to that input in a manner that is entertaining to the user while also communicating information to and from remote devices. Further, prior art devices have very limited learning capability, usually limited to voice recognition, and no auto-initiated learning sequences from environmental data, other devices or remote sources, which modify device behavior.

Therefore, a need exists for a method, device, and software program for providing entertainment by way of an interactive device, which receives environmental and communicated data, reacts in a manner aesthetically pleasing to the user while also communicating with remote devices and solicits environmental data responsive to conspicuous acts. A further need exists for such a method, device, and software program that will prioritize the manner in which they provide such reactions and communications so that emergency, harm-causing, or other critical processes will be addressed before ordinary processes.

SUMMARY OF THE INVENTION

The present invention provides a method, device, and software program for entertainment by way of an interactive device. The device receives environmental data by way of at least one of a plurality of sensors, optionally stores that data in a datastore, determines the presence of an event by comparing that data to previously received and stored data, and performs a conspicuous act in response to the detection of an event. The device periodically solicits environmental data responsive to auto-initiated conspicuous acts. In addition to performing a conspicuous act, the device can send a transmission by way of a transmission device, thereby communicating with another device or remote computer or datastore. Because multiple inputs may be received, the present invention can assign priorities to the inputs, executing resulting processes in their order of priority.

BRIEF DESCRIPTION OF THE DRAWINGS

The features of the present invention will be more readily understood from the following detailed description of examples of embodiments thereof when read in conjunction with the accompanying drawings, of which.

DETAILED DESCRIPTION OF A PREFERRED EMBODIMENT OF THE INVENTION

Although the present invention may be embodied in a number of different forms and the elements may be arranged in different configurations, a preferred embodiment of one form of the invention is described herein. Other embodiments or arrangements of components will be apparent to those skilled in the art, and such changes and modifications may be made without departing from the scope of this invention.

The present invention provides a method, device, and software program for providing entertainment by way of an interactive entertainment device. The present invention receives environmental data by way of at least one sensor, creating received data; stores the received data in a datastore to create stored data; and performs a conspicuous action in response to the received data and/or the stored data. Further, the device periodically solicits environmental data responsive to auto-initiated conspicuous acts. Moreover, the device can communicate by way of a transmission device to a remote system or network. Where multiple inputs are received, the present invention can assign priorities to that received data, resulting in corresponding priorities assigned to processes that are created in response to the received data.

Figure 1:
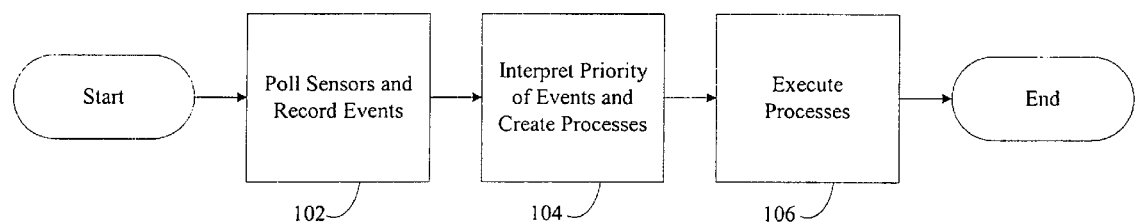
FIG. 1 is a high-level flow chart diagram depicting the method of the present invention.

Referring now to the drawings in greater detail, FIG. 1 is a high-level flow chart diagram illustrating the method of the present invention. At Block 101, the device periodically solicits environmental data responsive to conspicuous acts. The solicitation is auto-initiated by the device at a desired frequency from first use by the user. The frequency of further solicitation is modified based upon the environmental data sensed. The device hereby "learns" to adjust behavior or conspicuous acts and solicitation. At Block 102, the sensors are polled to see what environmental data they have received. The data is compared to default and/or previously recorded environmental data, which had been subsequently saved, to determine whether or not a change in various environmental levels has occurred. If so, there is an indication that an event of significance may have occurred. The system then moves to Block 104 where the received data is interpreted so as to assign to it a priority and create a process or subsequent execution. The system then moves to Block 106 where, in order of corresponding priority, the processes are executed resulting in communication by the device or a conspicuous action on the part of the device.

Figure 2:
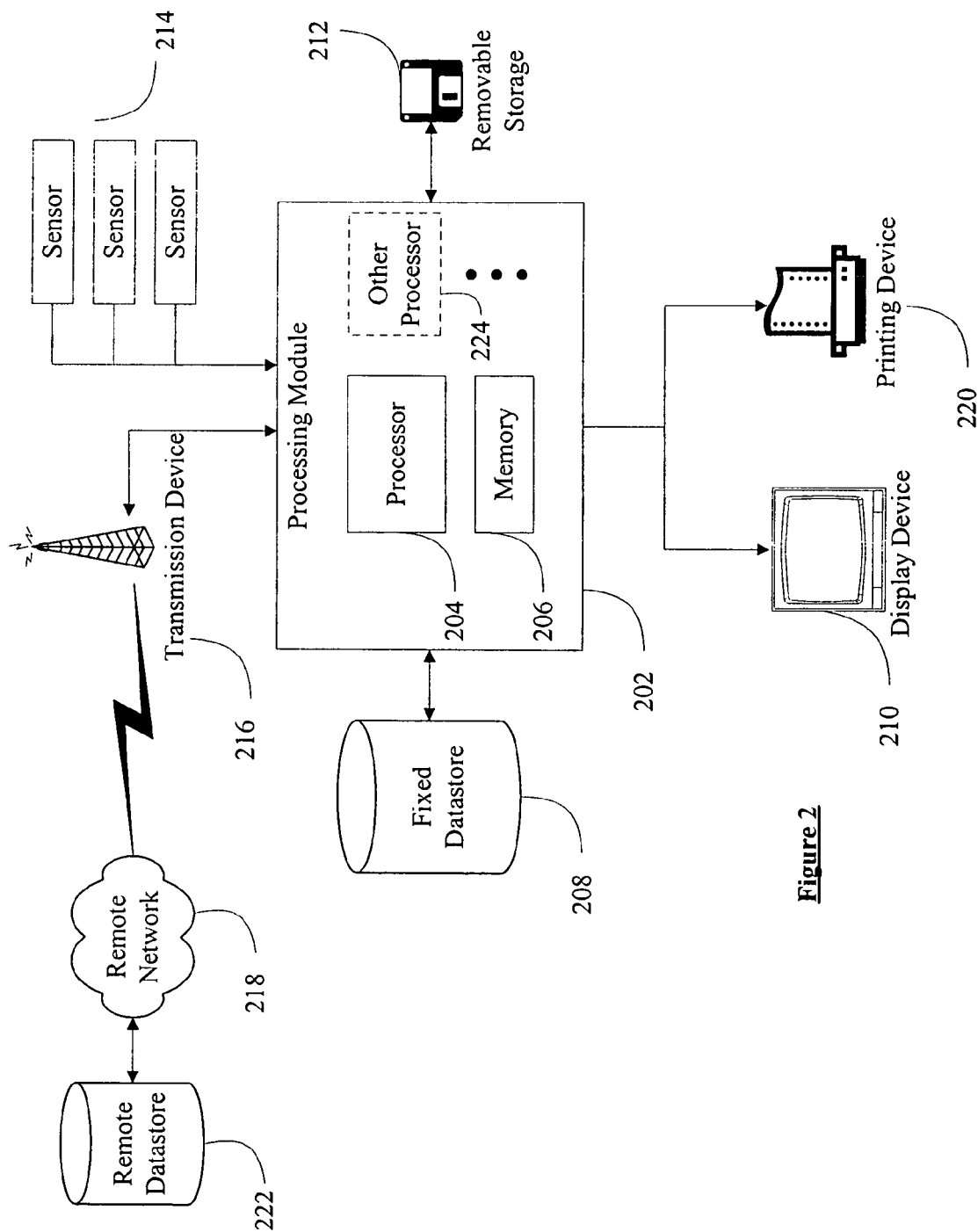
FIG. 2 is a diagram depicting an apparatus in accordance with the present invention.

FIG. 2 is a diagram of an apparatus representing an embodiment of the present invention. A processing module 202 receives, interprets, stores, and transmits data related to the present invention, and includes a processor 204 and memory 206 as are commonly known in the art. The processor 204 and memory 206 facilitate management of the operations of the processing module. The processor 204 may be a microprocessor, central processing unit (CPU) or micro-controller, application—specific integrated circuit (ASIC), field programmable gate array (FPGA), a digital signal processor, a micro-controller, or any other suitable processing device. If the processor 204 is a microprocessor, it can be a "PENTIUM," "POWER PC," or any other suitable microprocessor, CPU or micro-controller commonly known in the art. The memory 206 may be read-only memory, random access memory, rewritable disc memory, write-once-read-many disc memory, electrically erasable programmable ROM (EEPROM), holographic memory, remote storage memory or any other suitable memory device commonly known in the art. The memory 206 includes instructions that are executed by the processor 204, as well as programming variables or any other suitable programming source code or object code commonly known in the art.

In another embodiment of the present invention, in order to increase the speed of processing of various functions of the present invention, the system may include at least one other processor, which is dedicated to and/or specialized for at least one of the various features of the present invention. As with the processor 204, the at least one other processor 224 may be a microprocessor, ASIC, FPGA, digital signal processor, micro-controller, or any other suitable processor device.

The processing module 202 receives input from at least one sensor of a plurality of sensors 214 as is commonly known in the art. By way of example only, such a sensor could be designed and/or programmed to receive environmental data related to audio levels, light levels, temperature, global positioning (e.g., longitude, latitude, altitude, time), orientation, barometric pressure, vibration, proximity levels (i.e., positioning of other objects in the environment of the device), movement of the device in the environment (by way of, for example, an accelerometer), battery or other power source levels, and transmission signals. The system may include a user interface 210 that facilitates user input using an input device (not shown) or visual output to the user in the form of, for example, luminal communication or displayed text. Further visual output forms may include movement or vibration by the whole or part of the interactive entertainment device. The user interface 210 may also provide audio output to the user in the form of audible waveforms from a speaker or other suitable device.

The processing module 202 accesses the fixed datastore 208 that holds all data relevant to the present invention, including, for example, environmental data which has been read and subsequently stored, operational instructions as input by the user, and operational instructions and parameters incorporated into the device by design, including, but not limited to, auto-initiated solicitations. The fixed datastore 208 can take any format well known in the art. For example, such a format can be that of a relational database, a non-relational database, a record manager, a flat file, or any other suitable datastore format commonly known in the art.

After the processing module 202 receives input and processes it accordingly, the processing module 202 interprets the data (as will be discussed further with respect to FIG. 4), creates and executes processes (which will be discussed further with respect to FIG. 5), and then performs one or more actions corresponding to the interpretation of the received data. Such action may be conspicuous (i.e., intended for the user to sense), such as, for example, physical motion, audible communication such as solicitation, luminal communication, or printed communication; or inconspicuous such as, for example, sending the received data and/or stored data to a remote receiving device by way of a transmission device (e.g., by way of radio communication or other communications as are commonly known in the art). Furthermore, the processing module 202 may format an output of the results of its processing to at least one of a plurality of selectable media. The media can be selected manually or programmatically, being performed by firmware, hardware, or software within the processing module 202. In one embodiment of the present invention, the output is transmitted to the user interface 210, which can be any visual or audible output commonly known in the art. The information output by the processing module 202 may be retrieved from memory 206 for output to a different media or deleted from memory 206 based on the user's analysis of that information.

In another embodiment of the present invention, the output can be transmitted to a printing device 220 as is ordinarily used in the art to create a hard copy of the output. In yet another embodiment of the present invention, the output can be transmitted to a removable storage media 212 for transportation to other hardware devices (not shown) that may have connections to a remote datastore 222. The removable storage media 212 may be RAM, EEPROM, rewritable disc memory, tape, write-once-read-many disc memory, or any other suitable removable storage media commonly known in the art. One of ordinary skill in the art would recognize the availability of other media for receiving the output of the analysis.

The present invention may also send information to a remote network 218, which may include a computer network or a computer, on which a remote datastore 222 is present. The data may be sent by way of at least one transmission device, which can take the form of, for example, a wireless radio transceiver, cell transceiver, infrared transceiver, ultrasonic transceiver, or any other transmission device as is commonly known in the art. The data may also be sent from the at least one transmission device by way of a cable connecting the transmission device to a computer network or a computer. Through such devices commonly employed in the art, the transmission device 216 can transmit the output to various remote locations, such as the Internet or other remote network 218. The output can be sent to an e-mail account (not shown) as is commonly known in the art or a network based posting account (not shown) as requested by at least one of the settings in the remote network or presettings in the memory 206. The network based posting account (not shown) can take any form as is commonly known in the art, including but not limited to, an HTML-based message board, an HTML-based e-mail account on the World Wide Web or a local or remotely hosted database with private or public access.

Figure 3:
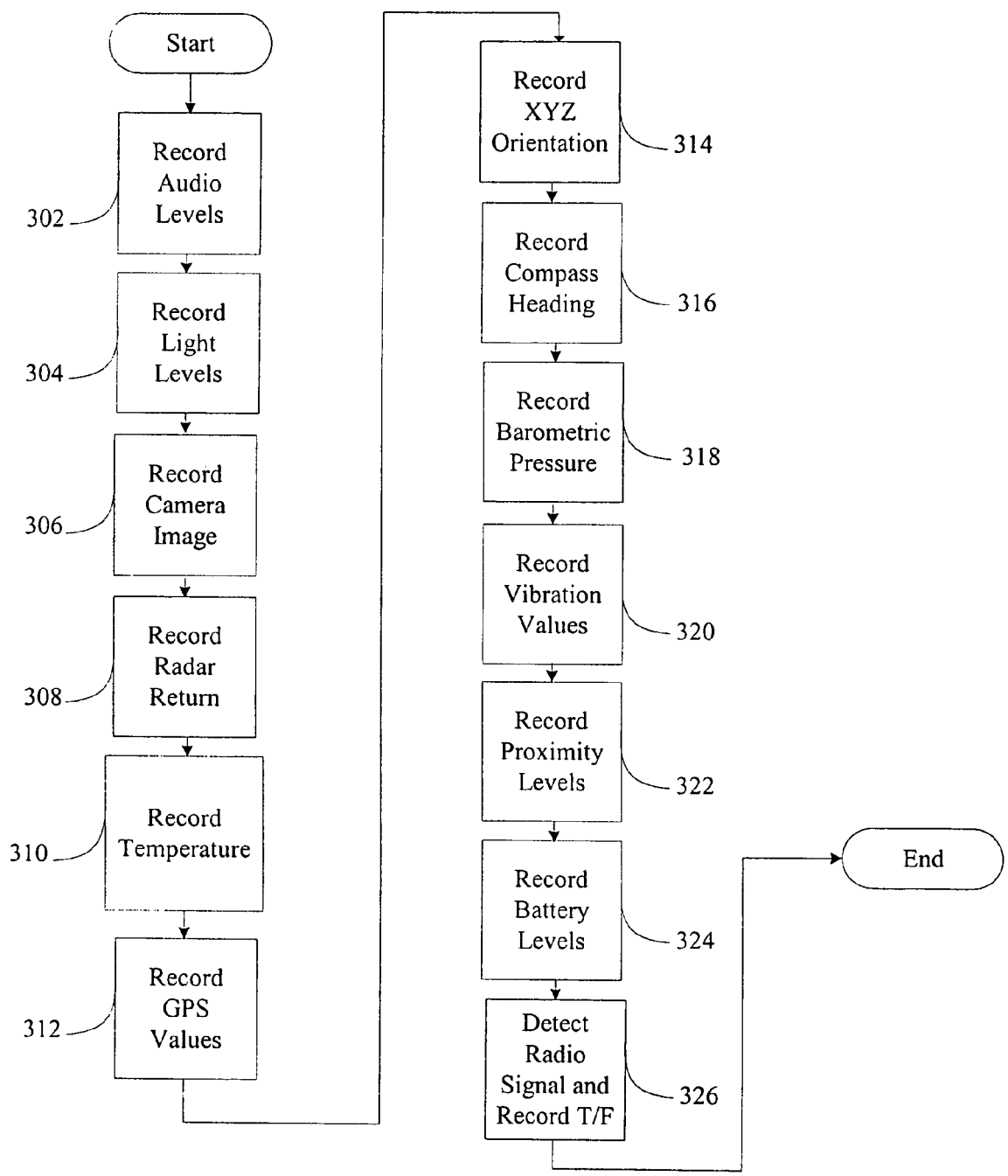
FIG. 3 is a diagram depicting the receipt of various environmental data.

FIG. 3 is a diagram depicting the receipt of various environmental data by way of a plurality of sensors. At Blocks 302-326, a plurality of sensors are polled to receive environmental data, thus creating received data. The sensors can take the form of any sensor as is commonly known in the art. At Block 302 an audio sensor records audio levels, which can include, for example, speech recognition software as is commonly known in the art. At Block 304 light levels (i.e., the level of brightness or luminescence) are recorded. At Block 306, a camera may be commanded to periodically record images or a series of surroundings for later recall and use in connection with recognition software as is commonly known in the art. For example, a recorded image may be used for facial recognition as a form of authentication or for location recognition in order to prompt a certain response. At Block 308, a radar may be commanded to periodically record returns or a series of returns of surroundings for later recall and use in connection with recognition software as is commonly known in the art. For example, a recorded return may be used to notice changes in surroundings, recognize shapes or objects in the environment and to gauge distances to objects in order to prompt a certain response. In this embodiment, the radar is a millimeter wave radar. However, any other suitable radar may be used in connection with the present invention. At Block 310, the ambient temperature surrounding the present invention is recorded. The temperature can be recorded in either Fahrenheit scale, Celsius scale, Kelvin scale, or any other suitable temperature scale as is commonly known in the art. The temperature scale could be selected manually or programmatically, being performed by firmware, hardware, or software within the processing module 202. At Block 312, global positioning system (GPS) values are recorded, indicating longitude, latitude, altitude, time and other coordinates relevant to that standard system of measurement. One of skill in the art will recognize that the GPS values enable the interactive entertainment device to determine velocity and record a history of movement.

At Block 314, XYZ orientation is recorded, relating to the rotational orientation relative to the Earth (e.g., upside down, right side up) of a device embodying the present invention. At Block 316, the compass heading of such a device is recorded. At Block 318, the barometric pressure in the immediate environment surrounding such a device is recorded. At Block 320, vibration values are recorded. At Block 322, the proximity levels (i.e., the position of objects in the immediate environment surrounding a device embodying the present invention) are recorded by an optical sensor. Such an optical sensor can be, for example, a Charge Coupled Device (CCD) or any other suitable optical sensor. At Block 324, the battery levels (i.e., the power remaining in a power supply providing power to a device embodying the present invention) are recorded. Finally, at Block 326, a sensor detects an input radio signal and records such signal, as well as a true/false value indicating whether such signal was received.

Figure 4:
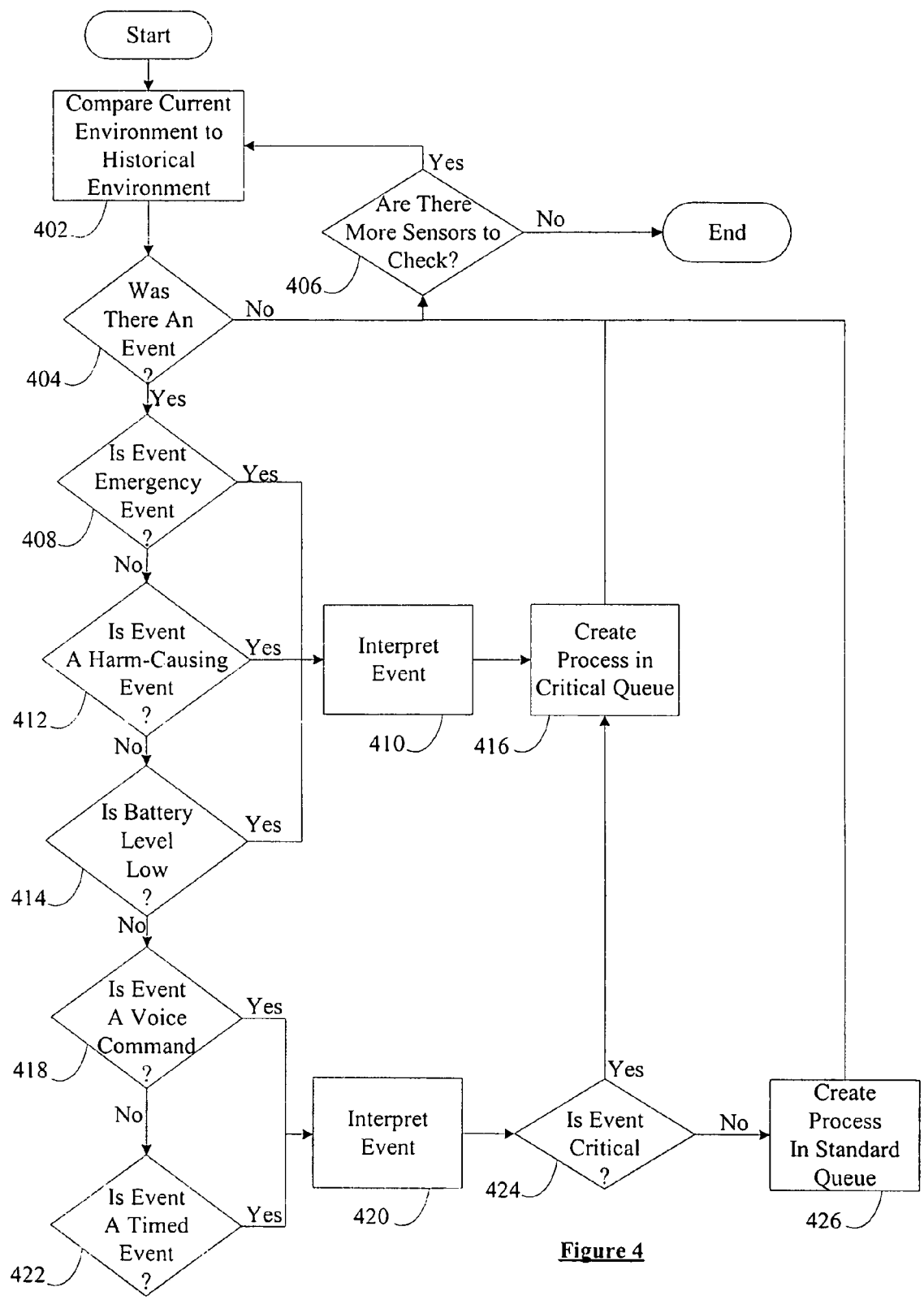
FIG. 4 is a flow chart illustrating the process of prioritizing those inputs and creating appropriate processes in response to that input.

FIG. 4 is a flow chart illustrating the process of prioritizing those inputs and creating appropriate processes in response to that input. At Block 402, environmental data that has been received by way of at least one sensor of the plurality of sensors is compared to historical environmental data, which has previously been received and stored in the fixed datastore. At Decision Block 404, the system determines whether there has been a change in the environment (as evidenced by significant and relevant differences between the current environment and the historical environment), indicating the presence of an event. If the system determines that there was not an event, at Decision Block 406, the system determines whether there are any more sensors to check for changes in the environment. That is, the system will perform the comparison of Block 402 and determine the existence of an event of Decision Block 404 for each sensor of the plurality of sensors in a predetermined sequential order. If the system determines that there are more sensors to check, the system returns to Block 402 and performs a comparison for the next sensor in the plurality of sensors. If the system determines that there are no more sensors to check, then this process terminates at the End Block.

Returning to Decision Block 404, if the system determines that there was an event, then the system proceeds to Decision Block 408 to determine whether the event is an emergency event, such as, for example, an automated call to an emergency service (e.g., "911"), broadcast of an emergency from another interactive entertainment device or broadcast of an Emergency Location Transmitter (ELT) device. If the system determines that the event is an emergency event, then the system proceeds to Block 410 to interpret that event (i.e., determining the nature of the event). If at Decision Block 408, the system determines that the event is not an emergency event, then the system proceeds to Decision Block 412, where the system determines whether or not the event is a harm-causing event. A harm-causing event may be, for example, an attempt to disrupt system software integrity (i.e., "hacking"), a sudden and/or extreme change in temperature, severe vibration levels that, for example, threaten the structural integrity of the system, a sudden and/or extreme change in altitude between the current GPS position and a GPS position being approached, or any such sudden and/or extreme change in recorded environmental data values that would threaten either the device embodying the present invention and/or is likely to present a danger to the user of such device. If the present invention determines that the event was a harm-causing event, then the system proceeds to Decision Block 410 as discussed above. If the system determines the event was not a harm-causing event, then the system proceeds to Decision Block 414 where it is determined whether the battery level is low. If the battery level is low, then the system proceeds to Decision Block 410 as discussed above. If the battery level is not low, then the system proceeds to Decision Block 418.

Returning to Block 410, the system interprets the nature of the emergency, harm-causing or battery level low event indicated by Decision Blocks 408-414. The interpretation of that event results, at Block 416, in the system creating a process in the critical process queue. That is, the event is translated into a process that would appropriately respond to that event (for example, a warning of an impending sudden drop in altitude upon the current path of the device), and that process is placed in a queue that has the highest priority for execution of processes. The system then proceeds back to Decision Block 406 to determine whether there are more sensors to poll.

Returning to Decision Block 418, the system, upon determining that the event is neither an emergency nor a harm-causing nor a battery level low event (requiring critical priority), the system then determines whether the event is a voice command. If the system determines that the event is a voice command, the system proceeds to Block 420 where it interprets that event in a manner similar to that described for Block 410. If the system determines that the event is not a voice command, the system proceeds to Decision Block 422, where the system determines whether or not the event is a timed event. Such an event can take the form of, for example, a reminder. Because the system has determined in Decision Block 404 that there was an event, assuming that prior to Decision Block 422 all Decision Blocks determining the nature of the event have provided negative answers, Decision Block 422 indicates that the event must be—by reason of elimination of any other type of event—a timed event (i.e., a timer or reminder). Thus, the system proceeds to Block 420 where the system interprets the event in a manner similar to that described with respect to Block 410. In contrast to the manner in which the system interprets the event in Decision Block 410, the system first proceeds to Decision Block 424 to determine whether the voice command or timed event is critical. For example, a critical voice command may be a command to call an emergency response system (e.g., "911") and provide GPS coordinates. If so, the system proceeds to Block 416 and creates an appropriate process in the critical process queue. If, on the other hand, the system determines that the event is not critical, then the system proceeds to Block 426, where the system, in a manner similar as that described in Block 416, creates an appropriate process but places that process in the standard process queue, which is a queue with a lower priority for execution than that of the critical process queue. The system then proceeds back to Decision Block 406 to determine whether there are more sensors to poll.

Figure 5:
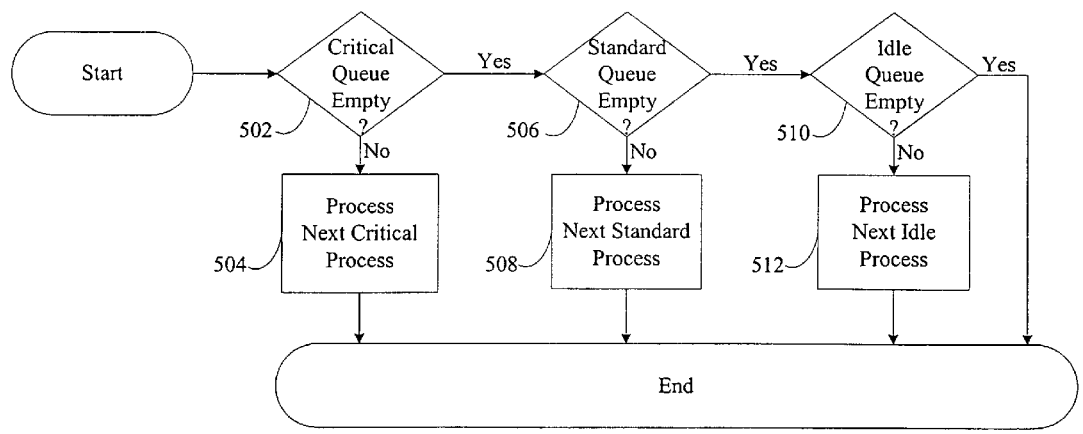
FIG. 5 is a flow chart illustrating the process of executing the created processes in order of their priority.

FIG. 5 is a flow chart illustrating the process of executing the created processes in order of their priority. At Decision Block 502, the system determines whether or not the critical process queue is empty. If the system determines the critical process queue is not empty, the system proceeds to Block 504 where the system processes the next critical process in the critical process queue. If, on the other hand, the system determines that the critical process queue is empty, then the system proceeds to Decision Block 506, where the system can now address the lower priority processes that may be present in the standard process queue. If the system determines that the standard process queue is not empty, then the system proceeds to step 508 where the system processes the next process in the standard process queue. If on the other hand, the system determines that the standard process queue is empty, then the system proceeds to Decision Block 510 to address the lowest priority idle process queue. At Decision Block 510, the system determines whether the idle process queue is empty. If the system determines the idle process queue is not empty, then the system precedes to Block 512 where the system processes the next process in the idle process queue. Examples of idle processes include, for example, automated receipt of software updates by way of the transmission device, entering into a low activity (i.e., "power save") mode, reads and/or writes to the removable storage medium, transmission of information to the display device or the printing device, building heuristic summaries to more quickly respond to environmental stimuli, checking system integrity through diagnostic routines or reads and/or writes to the fixed datastore. Upon processing the next process in the critical, standard, or idle process queues in Blocks 504, 508, and 512 respectively, or in determining that all three of those process queues are empty, the system proceeds to the End Block.

Those of ordinary skill in the art will recognize that the present invention makes advances in the area of entertainment devices. The present invention provides a method, system and software program for providing entertainment by way of an interactive device. The device receives environmental data by way of at least one of a plurality of sensors, optionally stores that data in a datastore, determines the presence of an event by comparing that data to previously received and stored data, and performs a conspicuous act in response to the detection of an event. The device can also send a transmission by way of a transmission device, thereby communicating with another device or datastore.

It should be understood that the implementation of other variations and modifications to the present invention in its various aspects will be apparent to those of ordinary skill in the art, and that the present invention is not limited by the specific embodiments described. For example, the present invention may be implemented using other forms of sensors as are commonly known in the art. Moreover, a more elaborate system of priority may be implemented, resulting in a greater number of process queues and a finer gradation of priorities. Further, a system of process threads could be generated where appropriate either in place of or in addition to the process queries so that all tasks are completed simultaneously. It is therefore contemplated that the present invention cover any and all modifications, variations, or equivalents that fall within the sphere and scope of the basic underlying principles claimed herein.

What is claimed is:

1. An integrated interactive entertainment apparatus comprising:
    a processing module disposed within the interactive entertainment apparatus comprising:
    a central processing unit; and
    memory operably coupled to the central processing unit;
    a datastore;
    a plurality of sensors in sensory contact with an environment integrally disposed on the interactive entertainment apparatus and operatively coupled to the central processing unit; and
    a mechanism integrally disposed on the interactive entertainment apparatus for performing a conspicuous action for attracting the attention of a user by the interactive entertainment apparatus and operatively coupled to the central processing unit;
    wherein the memory stores operational instructions to cause the processing module to:
    receive environmental data from the environment by way of at least one of the plurality of sensors to create received data;
    store the received data in a datastore to create stored data; and
    perform the conspicuous action for attracting the attention of the user in response to at least one of the received data and the stored data; and
    wherein the memory further stores operational instructions to cause the processing module to assign a priority to the received data to ensure execution of processes by order of importance.

2. The interactive entertainment apparatus of claim 1 further comprising:
    a transmission device operatively coupled to the central processing unit; and
    wherein the memory further stores operational instructions to cause the processing module to send at least one of the received data and the stored data to a remote receiving device by way of the transmission device.

3. The interactive entertainment apparatus of claim 1, wherein the memory further stores operational instructions to cause the processing module to:
    retrieve subsequent environmental data by way of the at least one sensor of the plurality of sensors to create subsequent received data;
    retrieve the stored data from the datastore; and
    compare the stored data to the subsequent received data to detect an event.

4. The interactive entertainment apparatus of claim 3, wherein the event comprises a change in one of: audio levels, light levels, temperature, global positioning, orientation, barometric pressure, vibration, proximity levels, battery levels, and transmission signals.

5. The interactive entertainment apparatus of claim 1, further comprising a display device operatively coupled to the central processing unit.

6. The interactive entertainment apparatus of claim 1, further comprising a removable media storage device operatively coupled to the central processing unit.

7. The interactive entertainment apparatus of claim 1 further comprising:
    at least one other processor operatively coupled to the processor,
    wherein the other processor is dedicated to the management and control of at least one operational instruction of the plurality of operational instructions.

8. An integrated interactive entertainment apparatus comprising: a processing module disposed within the interactive entertainment apparatus comprising:
    a central processing unit; and
    memory operably coupled to the central processing unit;
    a datastore;
    a plurality of sensors integrally disposed on the interactive entertainment apparatus and operatively coupled to the central processing unit; and a mechanism integrally disposed on the interactive entertainment apparatus for performing a conspicuous action by the interactive entertainment apparatus and operatively coupled to the central processing unit;

wherein the memory stores operational instructions to cause the processing module to:

auto-initiate at least one conspicuous action at a desired frequency;

receive environmental data by way of at least one of the plurality of sensors to create received data;

store the received data in a datastore to create stored data; and perform the conspicuous action in response to at least one of the received data and the stored data; and wherein the desired frequency of the auto-initiated conspicuous action is modified based upon the environmental data received responsive thereto.

9. An integrated interactive entertainment apparatus comprising:

a processing module disposed within the interactive entertainment apparatus comprising:

a central processing unit; and memory operably coupled to the central processing unit;

a datastore;

a plurality of sensors in sensory contact with an environment integrally disposed on the interactive entertainment apparatus and operatively coupled to the central processing unit; and a mechanism integrally disposed on the interactive entertainment apparatus for performing a conspicuous action for attracting the attention of a user by the interactive entertainment apparatus and operatively coupled to the central processing unit;

wherein the memory stores operational instructions to cause the processing module to:

receive environmental data from the environment by way of at least one of the plurality of sensors to create received data;

store the received data in a datastore to create stored data; and perform the conspicuous action for attracting the attention of the user in response to at least one of the received data and the stored data; and wherein the memory further stores operational instructions to cause the processing module to auto-initiate at least one conspicuous action for attracting the attention of the user at a desired frequency and modify the desired frequency of the auto-initiated conspicuous action based upon environmental data received from the environment responsive thereto.

* * * * *